(12) United States Patent
Choo et al.

(10) Patent No.: US 10,312,534 B2
(45) Date of Patent: Jun. 4, 2019

(54) SYSTEM AND METHOD FOR RECOVERING PERFORMANCE OF FUEL CELL

(71) Applicant: Hyundai Motor Company, Seoul (KR)

(72) Inventors: Hyun Suk Choo, Seoul (KR); Dae Keun Chun, Seoul (KR); Hwan Soo Shin, Gyeonggi-do (KR); Sung Keun Lee, Gyeonggi-do (KR); Jae Hyuk Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 1136 days.

(21) Appl. No.: 13/868,391

(22) Filed: Apr. 23, 2013

(65) Prior Publication Data

US 2014/0170510 A1 Jun. 19, 2014

(30) Foreign Application Priority Data

Dec. 18, 2012 (KR) .................. 10-2012-0148280

(51) Int. Cl.

| H01M 8/04 | (2016.01) |
|---|---|
| H01M 8/02 | (2016.01) |
| H01M 8/04223 | (2016.01) |
| H01M 8/04303 | (2016.01) |
| H01M 4/92 | (2006.01) |
| H01M 8/1018 | (2016.01) |

(52) U.S. Cl.
CPC ... *H01M 8/04238* (2013.01); *H01M 8/04223* (2013.01); *H01M 8/04303* (2016.02); *H01M 4/92* (2013.01); *H01M 2008/1095* (2013.01); *H01M 2250/20* (2013.01); *Y02T 90/32* (2013.01)

(58) Field of Classification Search
CPC .............. H01M 8/04; H01M 8/04223; H01M 8/04089; H01M 8/04104; H01M 8/08662
See application file for complete search history.

(56) References Cited

U.S. PATENT DOCUMENTS

| 6,127,057 | A | * | 10/2000 | Gorman | ............ | H01M 8/04223 |
|---|---|---|---|---|---|---|
| | | | | | | 429/429 |
| 6,881,510 | B1 | * | 4/2005 | Gyoten | ............. | H01M 8/04104 |
| | | | | | | 429/431 |
| 2007/0104982 | A1 | | 5/2007 | Xie | | |
| 2007/0184314 | A1 | * | 8/2007 | Kagami | ............ | H01M 8/04156 |
| | | | | | | 429/431 |
| 2009/0110993 | A1 | * | 4/2009 | Backhaus-Ricoult | ....................... | |
| | | | | | | H01M 8/04223 |
| | | | | | | 429/433 |

(Continued)

FOREIGN PATENT DOCUMENTS

| JP | 06260197 | 9/1994 |
|---|---|---|
| JP | 07006778 | 1/1995 |
| JP | 2009123534 A | 6/2009 |

(Continued)

*Primary Examiner* — Kenneth J Douyette
(74) *Attorney, Agent, or Firm* — Mintz Levin Cohn Ferris Glovsky and Popeo, P.C.; Peter F. Corless

(57) ABSTRACT

A method for recovering performance of a degraded polymer electrolyte fuel cell stack through electrode reversal. In detail, oxide films formed on the surface of platinum of a cathode is removed through an electrode reversal process that creates a potential difference between an anode and the cathode by supplying air to the anode instead of hydrogen and supplying a fuel to the cathode instead of air, thus rapidly recovering the performance of a degraded polymer electrolyte fuel cell stack.

6 Claims, 3 Drawing Sheets

(56) References Cited

U.S. PATENT DOCUMENTS

2011/0129751 A1\* 6/2011 Nagahara ............ H01M 8/0432
429/432

FOREIGN PATENT DOCUMENTS

| KR | 10-2002-0020966 | 3/2002 |
| KR | 10-2004-0106566 A | 12/2004 |
| KR | 10-2007-0044628 | 4/2007 |
| KR | 10-2007-0084733 | 8/2007 |
| KR | 10-2013-0010414 A | 1/2013 |
| KR | 10-1405551 B1 | 6/2014 |

\* cited by examiner

SYSTEM AND METHOD FOR RECOVERING PERFORMANCE OF FUEL CELL

CROSS-REFERENCE TO RELATED APPLICATION

This application claims under 35 U.S.C. § 119(a) the benefit of Korean Patent Application Publication No. 10-2012-0148280 filed Dec. 18, 2012, the entire contents of which are incorporated herein by reference.

BACKGROUND (a) Technical Field

The present invention relates to a system and method for recovering performance of a fuel cell stack. More particularly, the present invention relates to a system and method for recovering performance of a degraded polymer electrolyte fuel cell stack through electrode reversal.

(b) Background Art

A fuel cell stack is a type of generating device that generates electricity as main energy source of a fuel cell vehicle and is configured in such a manner that several tens to several hundreds of unit cells are stacked. The configuration of a unit cell of the fuel cell stack will be described with reference to FIG. 5. A membrane electrolyte assembly (MEA) is positioned in the center of the unit cell.

The membrane electrolyte assembly includes a polymer electrolyte membrane 10 (capable of transporting hydrogen ions (protons)), a cathode 12 and an anode 14. The cathode and anode are stacked on both sides of the electrolyte membrane 10 so that hydrogen and oxygen react with each other. Here, both the anode and the cathode each include an electrode layer (Pt/C) in which platinum (Pt) is supported on carbon.

Moreover, although not shown in FIG. 5, a gas diffusion layer (GDL) is stacked on the outside of each of the cathode 12 and the anode 14, a separator in which flow fields are formed to supply fuel and discharge water produced by a reaction is stacked on the outside of the gas diffusion layer, and an end plate for supporting and fixing a plurality of unit cells is connected to the outermost side end of the fuel cell.

Accordingly, at the anode of the fuel cell stack, an oxidation reaction of hydrogen occurs to produce hydrogen ions (protons) and electrons, and the produced hydrogen ions and electrons are transmitted to the cathode through the polymer electrolyte membrane and the separator. At the cathode, the hydrogen ions and electrons transmitted from the anode react with the oxygen-containing air to produce water. At the same time, electrical energy is generated by the flow of electrons.

During fuel cell stack operation, the polymer electrolyte membrane, which makes up the membrane electrode assembly, and the cathode and the anode, i.e., the electrode layers (Pt/C), stacked on both sides of the polymer electrolyte membrane become degraded, and the performance of the fuel cell stack is reduced as a result of degradation after a certain period of operation.

In particular, it is known that oxide films (i.e., Pt-oxide such as Pt—OH, Pt—O, Pt—O$_2$, etc.) formed, due to the degradation, on the surface of platinum of the cathode, having a particle size of several nanometers, interfere with the adsorption of oxygen (O$_2$) onto the surface of platinum to reduce the rate of an oxygen reduction reaction (ORR) at the cathode, thus degrading the performance of the fuel cell stack. Moreover, carbon monoxide (CO) of several parts per million contained in the fuel (hydrogen) is chemically adsorbed onto platinum to decrease the efficiency of hydrogen oxidation reaction (HOR). Furthermore, it is known that a local temperature increase of the fuel cell stack occurring during high power operation of the fuel cell vehicle shrinks the pore structure of the electrolyte membrane or rearranges SO$_3^-$ terminal groups to reduce ionic conductivity.

However, the performance degradation due to the structural changes in the membrane electrode assembly, i.e., the platinum oxide films, the CO in the fuel, the reduction in pores of the electrolyte membrane, etc., is mostly considered an irreversible degradation, and thus a method for recovering the membrane electrode assembly is needed.

One method for recovering performance of a degraded fuel cell stack includes supplying hydrogen to a cathode of the degraded fuel cell stack and storing the fuel cell stack for a predetermined time. An oxide formed on the surface of a platinum catalyst of the cathode is then reduced and removed while the fuel cell stack is stored for a predetermined time. These steps are then repeated a number of times to reduce the oxide on the surface of the platinum catalyst of the cathode.

As shown in FIG. 5, when hydrogen is supplied at 70° C. to the cathode 12 of the degraded fuel cell stack for more than 1 hour and the fuel cell stack is stored for 1 day at least three times repetitively so that the oxide films (PtOH, PtO, etc.) formed on the surface of platinum catalyst of the cathode 12 are removed and, at the same time, mobile platinum ions (Pt$^{x+}$, x=2,4), which are released during operation of the fuel cell stack, combine with electrons and are re-precipitated as highly active platinum (Pt) to recover the catalytic properties of the cathode, the performance of the fuel cell stack can be recovered by about 30 to 40%.

Moreover, the hydrogen supplied to the cathode 12 for 1 hour is diffused back to the anode 14 (expressed by the dotted arrow in FIG. 5), which consequentially forms a hydrogen atmosphere in both electrodes, thus reducing the catalyst oxides of the cathode.

However, the above-described method for recovering the performance of the fuel cell has drawbacks in that it takes too long time to recover the performance and the amount of hydrogen supplied to the cathode is too large. Thus, due to these problems with the system, it is very difficult to effectively recover performance without removing the fuel cell stack from the fuel cell vehicle.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a system and method for recovering performance of a fuel cell stack, which can effectively remove oxide films formed on the surface of platinum of a cathode through an electrode reversal process by creating a potential difference between an anode and the cathode by supplying air to the anode instead of hydrogen (as a fuel) and supplying a fuel (hydrogen) to the cathode instead of air, thus rapidly recovering the performance of a degraded polymer electrolyte fuel cell stack.

In one aspect, the present invention provides a method for recovering performance of a fuel cell stack. In particular, an electrode reversal process for creating a potential difference between an anode and a cathode by supplying air to the anode of the fuel cell stack instead of hydrogen (as a fuel) and supplying a fuel (hydrogen) to the cathode instead of air.

Coolant is then supplied to the anode and the cathode so that droplets are retained in the fuel cell stack. The fuel cell stack is then shut for a predetermined time.

In an exemplary embodiment, the electrode reversal process and the process of supplying the coolant may be performed at the same time (simultaneously).

In another exemplary embodiment, the air supplied to the anode and the fuel (hydrogen) may be supplied to the cathode until a potential difference of 1.0 V is created between the anode and the cathode.

In still another exemplary embodiment, the electrode reversal process and the process of supplying the coolant are performed at the same time for 10 minutes, and then the process of shutting down the fuel cell stack is performed for 10 minutes.

In yet another exemplary embodiment, the electrode reversal process and the process of supplying the coolant, which are performed at the same time for 10 minutes, and then the process of shutting down the fuel cell stack, which is performed for 10 minutes, are repeated more than three times.

In still yet another exemplary embodiment, in the electrode reversal process, an overpotential applied to the oxidation of a platinum (Pt) catalyst present in the cathode and an overpotential applied to the reduction of a platinum oxide may act as a driving force for an electrochemical reaction to increase the reduction rate of the platinum oxide on the surface of the cathode.

In a further exemplary embodiment, in the electrode reversal process, a high potential may be generated in the anode to desorb carbon monoxide impurities remaining in the anode.

In another further exemplary embodiment, in the process of shutting down the fuel cell stack, the fuel (hydrogen) and the air are crossed over to the anode and the cathode, respectively, to create a vacuum, thus causing swelling in which droplets retained in the anode and the cathode move toward each other through fine pores of an electrolyte membrane.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
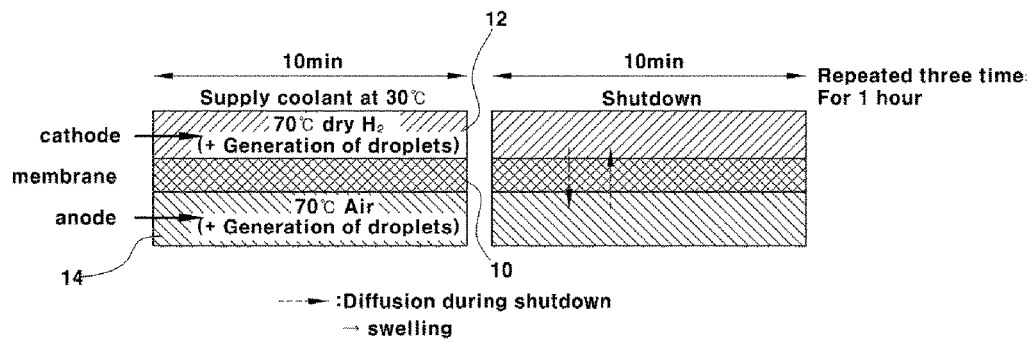
FIG. 1 is a conceptual diagram showing a method for recovering performance of a fuel cell stack according to an exemplary embodiment of the present invention.

Reference numerals set forth in the Drawings includes reference to the following elements as further discussed below:

10: electrolyte membrane
12: cathode
14: anode

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention is directed toward recovering performance of a degraded fuel cell stack by an electrode reversal technique that creates a potential difference between an anode and a cathode by supplying air to the anode instead of hydrogen (as a fuel) and supplying a fuel (hydrogen) to the cathode instead of air.

To this end, a method for recovering performance of a fuel cell stack according to the present invention is characterized in that, as shown in the conceptual diagram of FIG. 1, an electrode reversal process for creating a potential difference of about 1.0 V between two electrodes by supplying saturated air at 70° C. to an anode 14 and, at the same time, supplying saturated hydrogen to a cathode 12 is performed for about 10 minutes.

Preferably, the method for recovering the performance of the fuel cell stack according to the present invention is characterized in that the electrode reversal process, which is performed for about 10 minutes together with a coolant supply process, which will be described later, and a shut-down process for the fuel cell stack, which is performed for about 10 minutes, are repeated continuously for three iterations.

Figure 4:
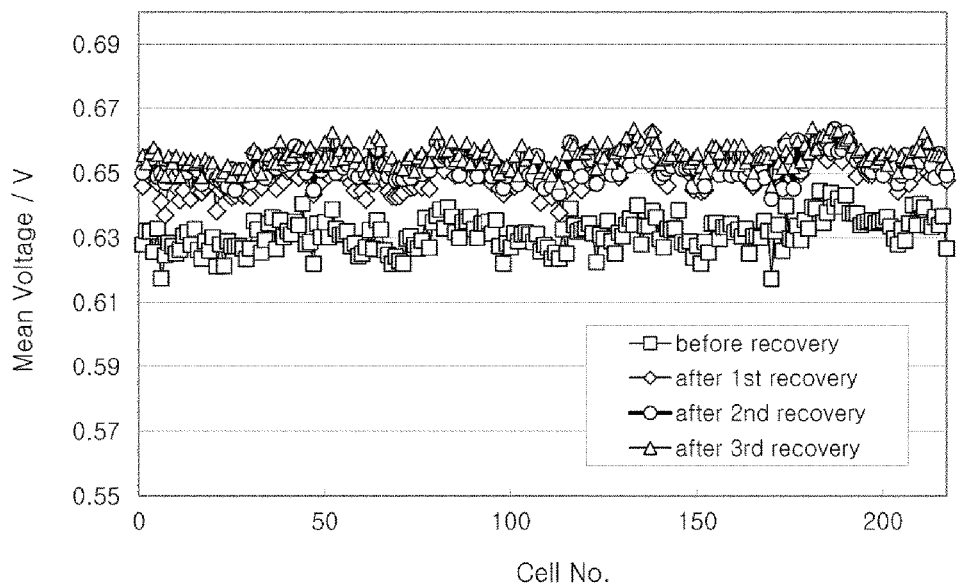
Figure 5:
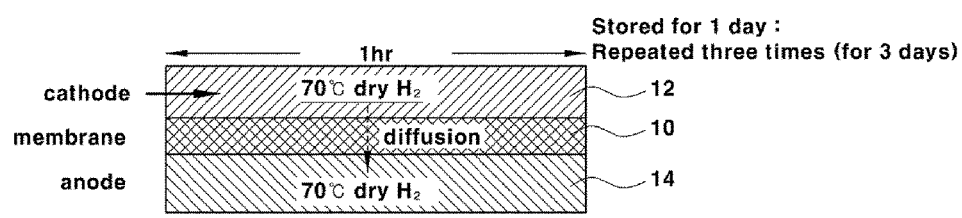
FIG. 5 is a conceptual diagram showing a conventional method for recovering performance of a fuel cell stack.

The reason that it is preferable that the process for recovering the performance of the fuel cell stack according to the exemplary embodiment of the present invention is performed at least three times is that, as shown in FIG. 4, the average voltage of cells significantly increases when the process is performed once, while the voltage increase tends to be smaller as the number of iterations increases, and the recovery of the performance becomes insignificant when the process is performed more than three times. Thus, it is preferable to limit the number of iterations of recovering the performance of the fuel cell stack to three times.

By the above-described electrode reversal process of the present invention, the potential of the cathode is near 0 V and that of the anode is 1.0 V compared to the standard hydrogen electrode (SHE), thus creating a potential difference of about 1.0 V.

Figure 2:
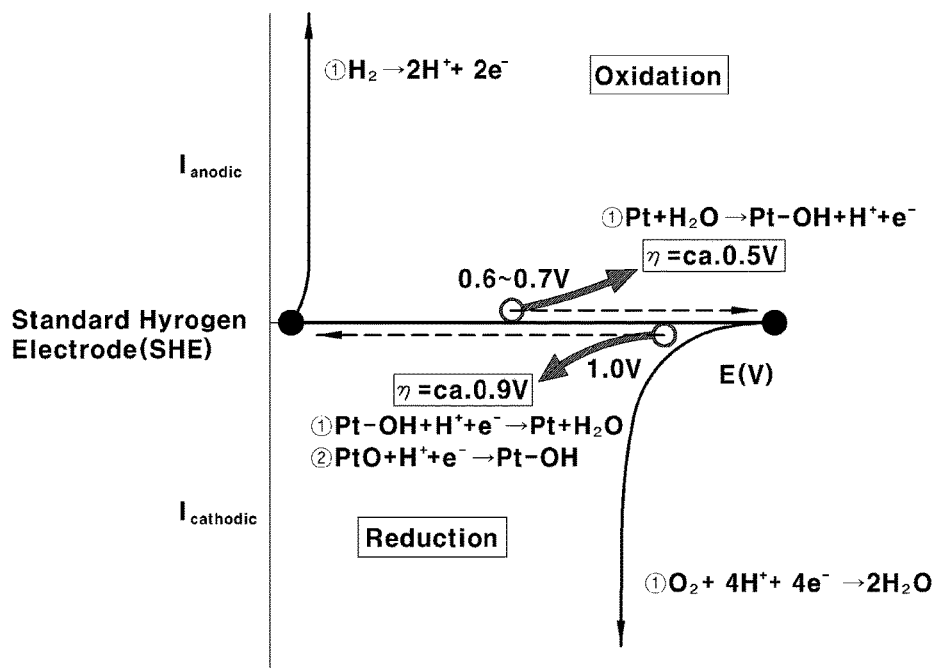
FIG. 2 is a current-voltage (IV) curve of a cathode and an anode according to an electrode reversal process of the exemplary embodiment of the present invention.

As shown in FIG. 2, an oxide (Pt—OH) on the surface of a platinum catalyst present in the cathode of a degraded membrane electrode assembly starts to be reduced from, 1.0 V, and most of the reduction is terminated below 0.6 V.

Accordingly, when the potential of the cathode nears 0 V by the above-described electrode reversal process, the overpotential applied to the reduction of the platinum oxide of the cathode is 0.9 V or more and, at this time, the overpotential (also called an activation polarization) applied to the reduction of the cathode oxide acts as a driving force η for an electrochemical reaction based on the Tafel equation, thus obtaining an effect of increasing the reduction rate of the platinum oxide on the surface of the cathode.

Meanwhile, it is known that during operation of the fuel cell stack, a very small amount of carbon monoxide (CO) impurities contained in the supplied hydrogen is chemically adsorbed onto the platinum surface of the anode to decrease the efficiency of hydrogen oxidation reaction (HOR). Since the potential of the anode is close to the standard hydrogen electrode (SHE) under normal operating conditions of the fuel cell stack, it is not easy to remove CO adsorbed onto the platinum surface of the anode under the normal operating conditions, but it is possible to desorbing CO when the potential of the anode is increased beyond of certain threshold.

Accordingly, when the electrode reversal process for creating a potential difference of about 1.0 V between two electrodes by supplying saturated air at 70° C. to the anode 14 and, at the same time, supplying saturated hydrogen to the cathode 12 is performed, a high potential (1.0 V compared to the standard hydrogen electrode) is generated in the anode 14, thus desorbing CO, referred to as CO oxidative stripping. At this time, —OH is adsorbed onto the platinum surface of the anode due to the high potential of the anode, and thus it is necessary to optimize the retention time of the electrode reversal.

According to the present invention, a process of supplying coolant at about 30° C. to the anode and the cathode such that condensed droplets are retained in the fuel cell stack is performed at the same time during the above-described electrode reversal process.

In more detail, as shown in FIG. 1, when the electrode reversal process for creating a potential difference of about 1.0 V between two electrodes by supplying saturated air at 70° C. to the anode 14 and, at the same time, supplying saturated hydrogen to the cathode 12 is performed for about 10 minutes, a process of supplying coolant at about 30° C. to the anode 14 and the cathode 12 is performed simultaneously. Continuously, during the electrode reversal process, a shutdown process for the fuel cell stack is performed for about 10 minutes after the coolant is supplied to the anode and the cathode for 10 minutes.

Accordingly, the hydrogen supplied to the cathode and the air supplied to the anode are switch, respectively, and consumed during the electrode reversal process, and thus a vacuum is created in the membrane electrode assembly including a polymer electrolyte membrane by the consumption of the hydrogen and oxygen crossed over during the shutdown process.

Due to the vacuum created, the droplets retained in the anode 14 move to the cathode 12 through fine pores of the electrolyte membrane 10, and the droplets retained in the cathode 12 move to the anode 14 through the fine pores of the electrolyte membrane 10, which is referred to as swelling (see the dotted arrow in FIG. 1). Due to this swelling, artificial water uptake is made in the electrolyte membrane and, at the same time, the droplets pass through the fine pores of the electrolyte membrane. As a result, the shrinking pores of the electrolyte membrane can be expanded, and $SO_3^-$ functional groups can be rearranged in the inner surface of the pores, thus improving ionic conductivity of the electrolyte membrane.

Next, the present invention will be described in more detail with reference to Examples and Test Examples.

Examples 1 to 3

In Example 1, a performance recovery process for a fuel cell stack, in which a process of supplying saturated air at 70° C. to an anode of a fuel cell stack, a process of supplying saturated hydrogen to a cathode, and a process of supplying coolant at about 30° C. to the anode and the cathode were performed at the same time for 10 minutes, and then a shutdown process for the fuel cell stack was performed for 10 minutes, was performed once.

In Examples 2 and 3, the above-described performance recovery process was repeated twice and three times, respectively.

Test Example 1

Figure 3:
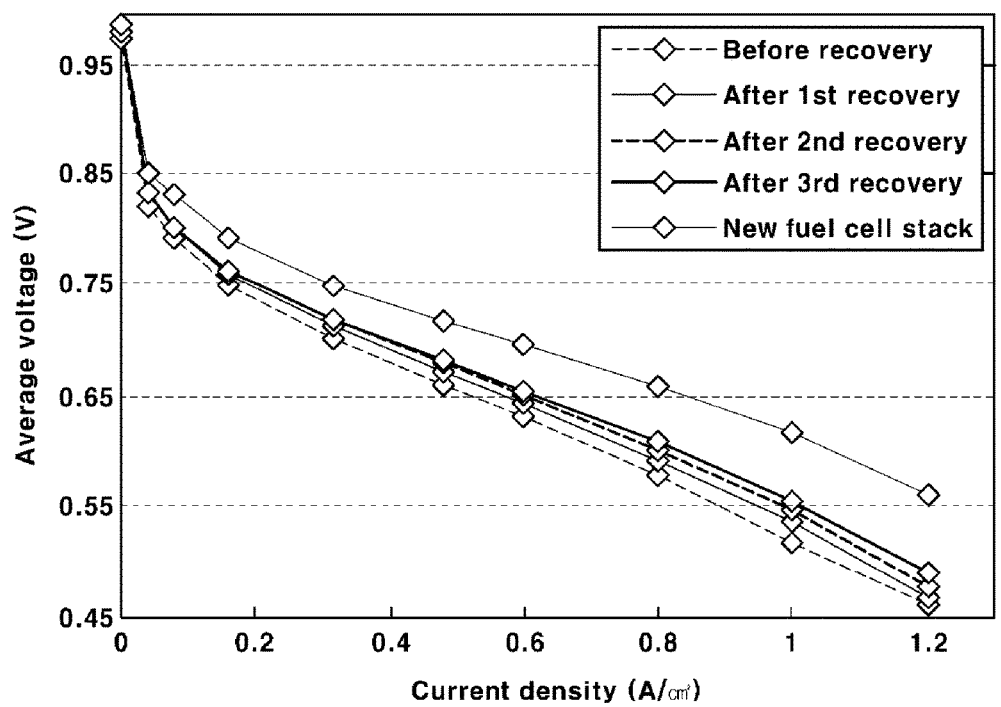
FIGS. 3 and 4 are graphs showing the test results for a method for recovering performance of a fuel cell stack according to the exemplary embodiment of the present invention.

Current-voltage was measured after the performance recovery process in Examples 1 to 3 to compare the performance of a new fuel cell stack with the performance of a degraded fuel cell stack before recovery, and the results are shown in FIG. 3.

As can be seen from FIG. 3, in Examples 1 to 3 where the performance recovery process for the fuel cell stack based on the electrode reversal process of the present invention was performed once to three times, the performance of each fuel cell stack was recovered significantly, compared to the current-voltage of the degraded fuel cell stack before the recovery. In particular, in Example 3 where the performance recovery process for the fuel cell stack of the present invention was performed three times, it can be seen that the current-voltage performance of the fuel cell stack was close to that of the new fuel cell stack and recovered significantly.

Test Example 2

Cell voltage distribution was measured at 0.6 A/cm$^2$ after the performance recovery process in Examples 1 to 3 and compared with the cell voltage distribution of the degraded fuel cell stack before the recovery, and the results are shown in FIG. 4.

As can be seen from FIG. 4, the average voltage of cells in each fuel cell stack after the performance recovery process in Examples 1 to 3 was increased compared to that of the degraded fuel cell stack before the recovery and, in particular, the average voltage in Example 3 was increased by about 26 mV, yielding a recovery of 39.3%, compared to the degraded fuel cell stack before the recovery.

Advantageously, the present invention provides the following effects. First, with the application of the electrode reversal technique to a degraded fuel cell stack, it is possible to effectively remove oxide films formed on the platinum surface of the cathode. Second, since a high potential is applied to the anode by the electrode reversal process of the present invention, it is possible to desorb CO impurities remaining in the anode. Third, since the coolant is supplied and then the fuel cell stack is shut down during the electrode reversal process of the present invention, a vacuum is created in the anode and the cathode to effectuate swelling, in which droplets retained in the anode and the cathode move toward each other through fine pores of an electrolyte membrane, thus improving the ionic conductivity of the electrolyte membrane.

Through the removal of the oxide films on the surface of platinum of the cathode, the removal of CO impurities from the anode, and the improvement of ionic conductivity of the electrolyte membrane, it is possible to rapidly recover the performance of the degraded fuel cell stack, to significantly reduce the time required for the performance recovery of the fuel cell stack, and to significantly reduce the amount of hydrogen used for the performance recovery of the fuel cell stack.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method for recovering performance of a fuel cell stack, the method comprising:
    creating a potential difference between an anode and a cathode by supplying air to the anode of the fuel cell stack instead of hydrogen and supplying hydrogen to the cathode instead of air for a predetermined period while maintaining an open circuit voltage of the fuel cell stack, and, at the same time, supplying coolant that is below a predetermined temperature to the fuel cell stack so that droplets are retained in the anode and the cathode; and
    shutting down the fuel cell stack for a predetermined time such that a vacuum is created in the anode and the cathode by crossing over of the hydrogen and oxygen in the air between the cathode and the anode, and consuming the hydrogen and the oxygen crossed over, thereby initiate swelling in which droplets retained in the anode and the cathode move toward each other through fine pores of an electrolyte membrane due to the vacuum created in the anode and the cathode;
    wherein the potential difference is created and the coolant is supplied at the same time, and
    wherein the supplied coolant reduces a temperature of a membrane between the cathode and the anode.

2. The method of claim 1, wherein the air is supplied to the anode and the fuel (hydrogen) is supplied to the cathode until a potential difference of 1.0 V is created between the anode and the cathode.

3. The method of claim 1, wherein the potential difference is created and the coolant is supplied at the same time for 10 minutes, and then the fuel cell stack is shut down for 10 minutes.

4. The method of claim 1, wherein creating a potential difference, supplying the coolant, and shutting down the fuel cell stack, are repeated at least three times.

5. The method of claim 1, wherein while creating a potential difference, an overpotential applied to the oxidation of a platinum (Pt) catalyst present in the cathode and an overpotential applied to a reduction of a platinum oxide act as a driving force for an electrochemical reaction to increase a reduction rate of the platinum oxide on a surface of the cathode.

6. The method of claim 1, wherein when the potential difference is created, a potential difference above a predetermined threshold is generated in the anode to desorb carbon monoxide impurities remaining in the anode.

* * * * *